US012664773B2

(12) United States Patent
Corbett

(10) Patent No.: US 12,664,773 B2
(45) Date of Patent: ***Jun. 23, 2026

(54) CLOUD MODEL ORCHESTRATION OF SPACEBORNE DATA

(71) Applicant: Microsoft Technology Licensing, LLC, Redmond, WA (US)

(72) Inventor: George Taylor Corbett, Rockville, MD (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/208,256

(22) Filed: Jun. 9, 2023

(65) Prior Publication Data

US 2024/0282097 A1 Aug. 22, 2024

Related U.S. Application Data

(60) Provisional application No. 63/446,755, filed on Feb. 17, 2023.

(51) Int. Cl.
*G06V 10/96* (2022.01)
*G06V 10/26* (2022.01)
(Continued)

(52) U.S. Cl.
CPC .............. *G06V 10/96* (2022.01); *G06V 10/26* (2022.01); *G06V 10/761* (2022.01); *G06V 10/95* (2022.01);
(Continued)

(58) Field of Classification Search
CPC ...... G06V 10/96; G06V 10/761; G06V 10/95; G06V 10/26; G06V 20/13; H04B 7/18513; H04W 74/006; H04W 74/04
See application file for complete search history.

(56) References Cited

U.S. PATENT DOCUMENTS

2014/0019166 A1* 1/2014 Swanson ................ G06Q 40/08
705/4
2016/0300375 A1 10/2016 Beckett et al.
(Continued)

OTHER PUBLICATIONS

"Application as Filed in U.S. Appl. No. 18/204,151", filed May 31, 2023, 35 Pages.
(Continued)

*Primary Examiner* — David Perlman
(74) *Attorney, Agent, or Firm* — Alleman Hall LLP

(57) ABSTRACT

The disclosed technology is generally directed to cloud model orchestration of constrained-environment-device data. In one example of the technology, on a first distributed system, on-cloud models are stored. For each on-cloud model, a corresponding set of reference embeddings is stored. Images obtained from sensors onboard at least one constrained-environment device that is external to the first distributed system are received. Image tiles are stored such that the image tiles include, for each image, evenly-spaced portions of the image. Image embeddings generated via an embedding-generation model from the image tiles are stored. A request that is associated with a first model of the on-cloud models is received. Using the set of reference embeddings for the first model and the image embeddings, for each image tile, whether the first model should be executed on the image tile is determined. The first model is executed on the determined image tiles.

20 Claims, 5 Drawing Sheets

(51) Int. Cl.

| | |
|---|---|
| *G06V 10/74* | (2022.01) |
| *G06V 10/94* | (2022.01) |
| *G06V 20/13* | (2022.01) |
| *H04B 7/185* | (2006.01) |
| *H04W 74/00* | (2009.01) |
| *H04W 74/04* | (2009.01) |

(52) U.S. Cl.
CPC ......... *G06V 20/13* (2022.01); *H04B 7/18513* (2013.01); *H04W 74/006* (2013.01); *H04W 74/04* (2013.01)

(56) References Cited

U.S. PATENT DOCUMENTS

| | | |
|---|---|---|
| 2017/0070939 A1 | 3/2017 | Chong |
| 2017/0250751 A1 | 8/2017 | Kargieman et al. |
| 2017/0336215 A1 | 11/2017 | Racz |
| 2018/0288374 A1 | 10/2018 | Turner |
| 2019/0340499 A1 | 11/2019 | Burger |
| 2021/0342669 A1 | 11/2021 | Godwin, IV |
| 2021/0344414 A1 | 11/2021 | Hawthorne |
| 2021/0383144 A1* | 12/2021 | Price ..................... G01S 19/396 |
| 2022/0101127 A1 | 3/2022 | Torras |
| 2023/0050870 A1 | 2/2023 | Andrew |
| 2023/0196201 A1 | 6/2023 | Imig |

OTHER PUBLICATIONS

U.S. Appl. No. 18/208,256, filed Jun. 9, 2023.

U.S. Appl. No. 18/204,151, filed May 31, 2023.

Asad, et al., "Learning attention models for resource-constrained, self-adaptive visual sensing applications", Proceedings of the Conference on Research in Adaptive and Convergent Systems, Oct. 20, 2022, pp. 165-171.

Braten, et al., "Autonomous IoT Device Management Systems: Structured Review and Generalized Cognitive Model", IEEE Internet of Things Journal, vol. 8, Issue 6, Nov. 3, 2020, pp. 4275-4290.

Daniel Wischounig-Strucl, "Resource aware and incremental mosaics of wide areas from small-scale UAVs", Machine Vision and Applications, vol. 26, Jul. 11, 2015, pp. 885-904. (Submitted in 3 parts due to size constraints).

Denby, et al., "Orbital Edge Computing Nanosatellite Constellations as a New Class of Computer System", Proceedings of the 33rd annual ACM symposium on user interface software and technology, Mar. 9, 2020, pp. 939-954.

Hajjaji, et al., "An improved tile-based scalable distributed management model of massive high-resolution satellite images", Procedia computer science, vol. 192, Jan. 1, 2021, pp. 2931-2942.

International Search Report and Written Opinion received for PCT Application No. PCT/US2024/015085, Apr. 22, 2024, 14 pages.

International Search Report and Written Opinion received for PCT Application No. PCT/US2024/015087, Apr. 19, 2024, 12 pages.

International Search Report and Written Opinion received for PCT Application No. PCT/US2024/015088, Apr. 23, 2024, 17 pages.

Li, et al., "Image retrieval from remote sensing big data: A survey", Information Fusion, vol. 67, Oct. 14, 2020, pp. 94-115.

Rolf, et al., "A generalizable and accessible approach to machine learning with global satellite imagery", Nature Communications, vol. 12, Issue 1, Jul. 20, 2021, 11 Pages.

Ruzicka, et al., "RaVaen: unsupervised change detection of extreme events using ML on—board satellites", Scientific Reports, vol. 12, No. 1, Oct. 8, 2022, 10 Pages.

International Search Report and Written Opinion received for PCT Application No. PCT/US2024/015086, Apr. 24, 2024, 15 pages.

Raj, et al., "Lightweight SAR Ship detection and 16 Class Classification using Novel Deep Learning Algorithm with a Hybrid Preprocessing Technique", International journal of remote sensing, vol. 43, No. 15-16, Jan. 2, 2022, 29 Pages.

"Tutorial 4: Train SimSiam on Satellite Images", Retrieved From: https://docs.lightly.ai/self-supervised-learning/tutorials/package/tutorial_simsiam_esa.html, Retrieved On: Jan. 23, 2023, 13 Pages.

"Research talk: Low-Latency Real-Time Insights from Space", Retrieved from: https://www.microsoft.com/en-us/research/video/research-talk-low-latency-real-time-insights-from-space/, Oct. 18, 2022, 3 Pages.

Keisler, et al., "Visual Search Over Billions of Aerial and Satellite Images", In Repository of arXiv:2002.02624v1, Feb. 7, 2020, 7 Pages.

Wolf, Jared, "RAIC: Solving Geospatial Data's Speed-to-Insight Problem", Retrieved From: https://blog.synthetaic.com/synthetaic-blog/raic-solving-geospatial-datas-speed-to-insight-problem, Jan. 18, 2023, 8 Pages.

Non-Final Office Action mailed on Aug. 12, 2025, in U.S. Appl. No. 18/203,567, 29 Pages.

Non-Final Office Action mailed on Jun. 11, 2025, in U.S. Appl. No. 18/204,151, 11 pages.

Final Office Action mailed on Oct. 16, 2025, in U.S. Appl. No. 18/204,151, 11 pages.

Non-Final Office Action mailed on Nov. 6, 2025, in U.S. Appl. No. 18/203,585, 14 pages.

So, et al., "FedSpace: An Efficient Federated Learning Framework at Satellites and Ground Stations", In Repository of arXiv:2202.01267v1, Feb. 2, 2022, 11 Pages.

Examiner Interview Summary mailed on May 4, 2026, in U.S. Appl. No. 18/204,151, 04 pages.

Final Office Action mailed on Apr. 7, 2026, in U.S. Appl. No. 18/203,585, 17 Pages.

Final Office Action mailed on Feb. 19, 2026, in U.S. Appl. No. 18/203,567, 33 pages.

* cited by examiner

CLOUD MODEL ORCHESTRATION OF SPACEBORNE DATA

CROSS-REFERENCE TO RELATED APPLICATION(S)

This application claims priority to U.S. Provisional Pat. App. No. 63/446,755, filed Feb. 17, 2023, entitled "SPACE-BORNE-SENSOR-DATA-RELATED PRIORITIZATION AND ORCHESTRATION". The entirety of this afore-mentioned application is incorporated herein by reference.

BACKGROUND

Spaceborne data, such as satellite images, has numerous useful applications in agriculture, biodiversity, cartography, conservation, disaster response, education, fishing, forestry, geology, landscape analysis, meteorology, oceanography, and regional planning, among other things. For instance, spaceborne data may be used to monitor disasters such as fires, volcanic activity, landslides, avalanches, and the like. Spaceborne data may also be used for rapid mapping after a disaster. Spaceborne data may be used to locate ships in the ocean, planes on the tarmac, or the like. Spaceborne data may be used in various hydrological applications, such as drought and soil water monitoring, discovering hidden river channels, and the like. These are but a few of the many possible applications for spaceborne data.

SUMMARY OF THE DISCLOSURE

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly stated, the disclosed technology is generally directed to cloud model orchestration of constrained-environment-device data. On a cloud service that includes a first distributed system, a plurality of on-cloud models is stored. For each on-cloud model of the plurality of on-cloud models, a corresponding set of reference embeddings is stored. A plurality of images obtained from sensors onboard at least one constrained-environment device that is external to the first distributed system is received. A plurality of image tiles is stored such that the plurality of image tiles includes, for each image of the plurality of images, evenly-spaced portions of the image. A plurality of image embeddings generated via an embedding-generation model from the plurality of image tiles is stored. A request that is associated with a first model of the plurality of on-cloud models is received. Using the set of reference embeddings for the first model and the plurality of image embeddings, for each image tile in the plurality of image tiles, whether the first model should be executed on the image tile is determined. For each image tile for which a determination is made that the first model should be executed on that image tile, the first model is executed on that image tile.

Other aspects of and applications for the disclosed technology will be appreciated upon reading and understanding the attached figures and description.

BRIEF DESCRIPTION OF THE DRAWINGS

Non-limiting and non-exhaustive examples of the present disclosure are described with reference to the following drawings. In the drawings, like reference numerals refer to like parts throughout the various figures unless otherwise specified. These drawings are not necessarily drawn to scale.

For a better understanding of the present disclosure, reference will be made to the following Detailed Description, which is to be read in association with the accompanying drawings, in which.

DETAILED DESCRIPTION

A cloud service may provide a variety of services associated with large amounts of constrained-environment device data, such as spaceborne data, stored by the cloud service. The cloud service stores a large number of images obtained from sensors of external constrained-environment devices, such as many billions of images, and may provide services including reverse image searching, and also enable on-cloud models to be run on images stored by the service in some examples. The on-cloud models may include, for example, artificial intelligence (AI) models that are plane detector models, ship detector models, building detector models, cloud detector models, methane detector models, fire detector models, car detector models, or the like.

However, it may be very expensive to run an on-cloud model on all of the relevant images. For example, a client may wish to detect poultry barns on all high-resolution images across all of the images in the continental United States, which may be many millions of images. Accordingly, the cloud service performs cloud model orchestration to determine which models should be run on which image tiles stored by the cloud service. For instance, in the poultry barn use case, cloud model orchestration occurs as follows in some examples. The cloud service identifies image tiles that are similar to image tiles in which poultry barns have been previously identified. Accordingly, the model would not execute on image tiles of water, forest, or dense urban areas where poultry barns are not found.

The cloud service stores image tiles of images that were obtained from external constrained-environment devices. The image tiles are evenly-sized portions of the images. The cloud service also stores, for each of the image tiles, an embedding that corresponds to the image tile. The embeddings stored on the cloud service were generated from the image tiles using an embedding-generation model. When the cloud service receives a client request that is associated with one or more of the on-cloud models, the cloud service performs cloud orchestration. In the cloud orchestration performed by the cloud service, the cloud service uses the embeddings to determine which of the image tiles the on-cloud model that is associated with the client request should be run on. After it is determined which image tiles the on-cloud model that is associated with the client request should be run on, the cloud service runs the on-cloud model that is associated with the client request on the determined image tiles.

Illustrative Systems

Figure 1:
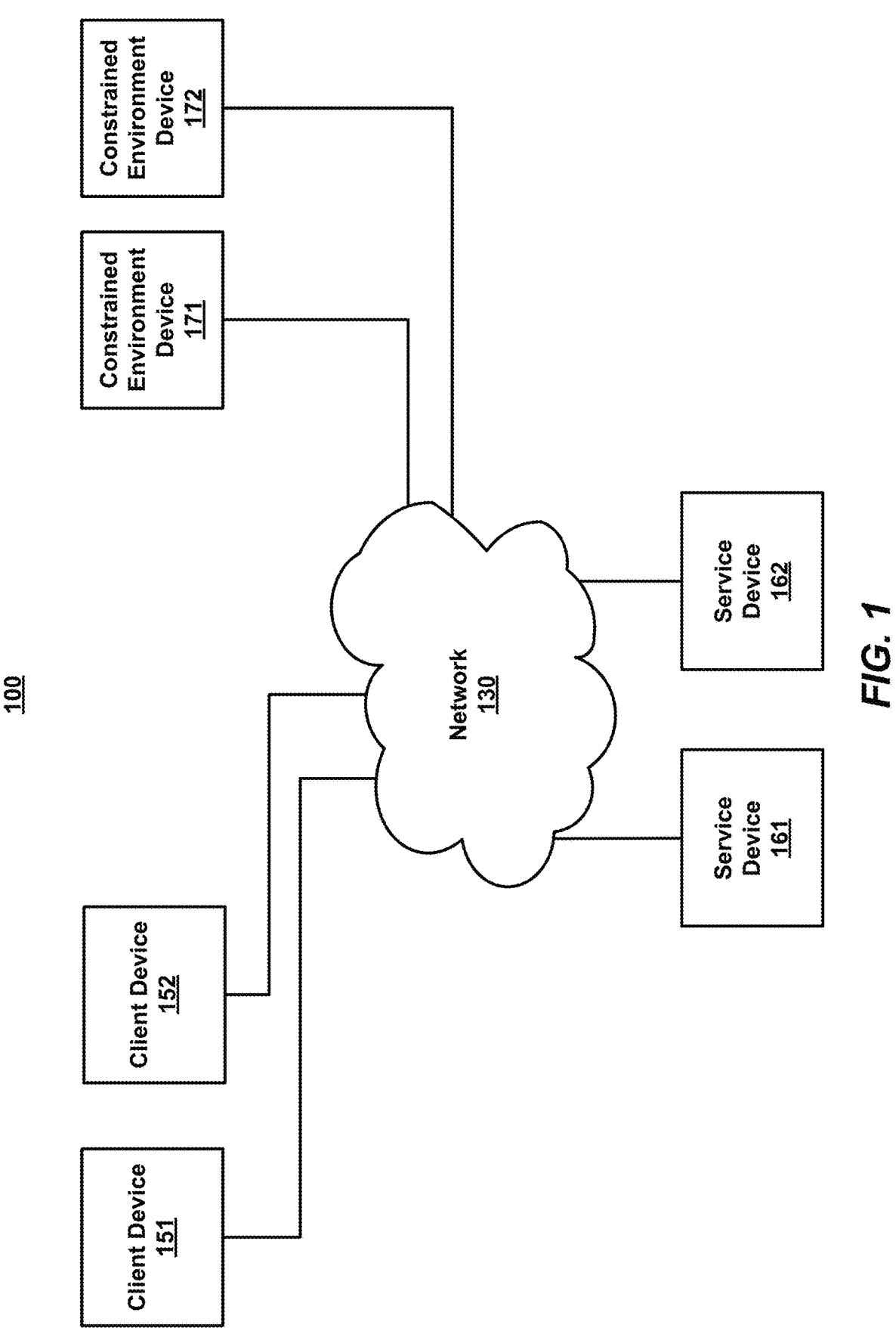
FIG. 1 is a block diagram illustrating an example of a network-connected system.

FIG. 1 is a block diagram illustrating an example of a system (100). FIG. 1 and the corresponding description of FIG. 1 in the specification illustrate an example system for illustrative purposes that does not limit the scope of the disclosure. System 100 is described as follows in accordance with some examples. System 100 includes network 130, as well as client device 151, client device 152, service device 161, service device 162, constrained-environment device 171, and constrained-environment device 172, which all connect to network 130. Service device 161 and service device 162 are part of one or more distributed systems. One or more of these distributed systems includes two or more devices that are in networked communication with each other.

System 100 operates as follows in some examples.

Figure 5:
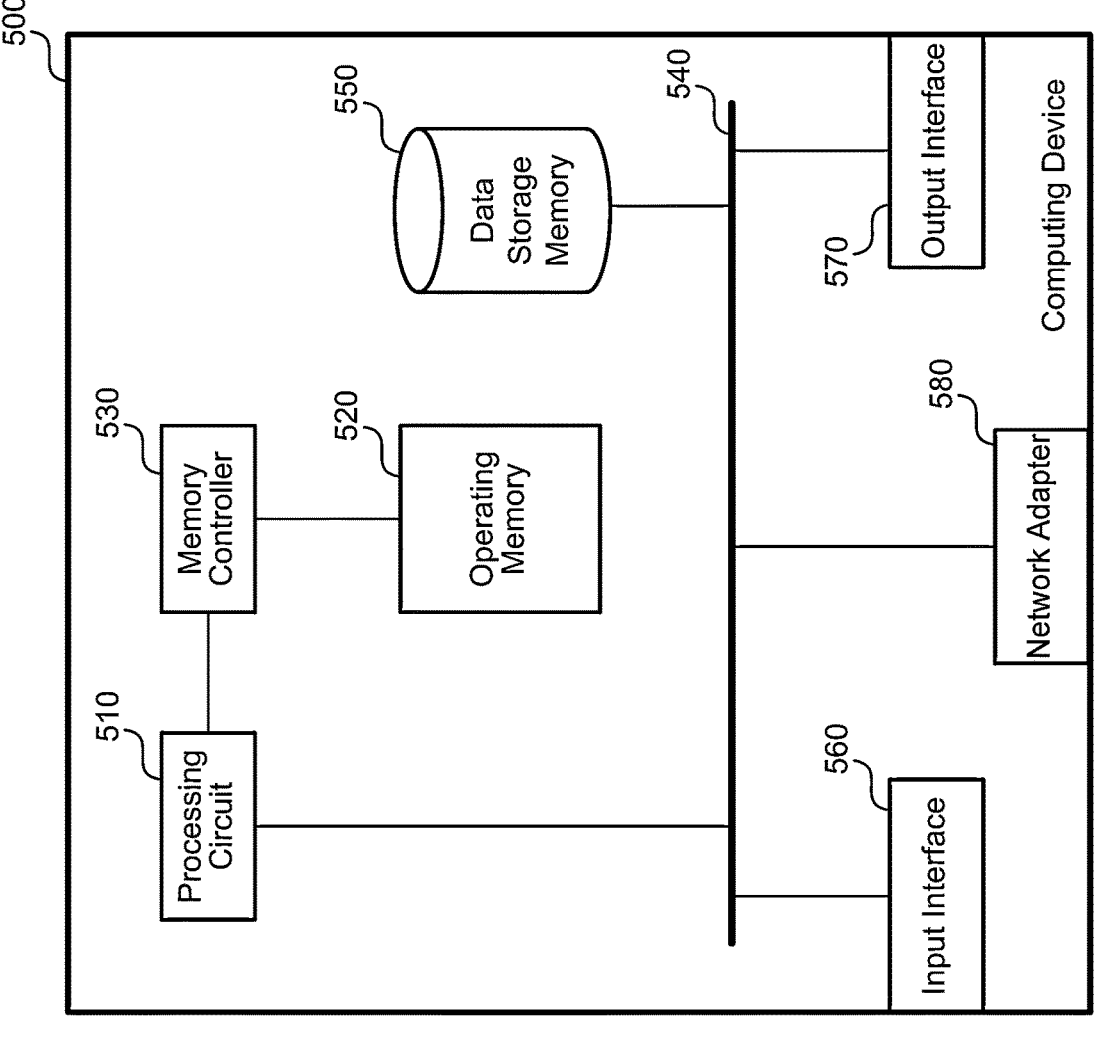
FIG. 5 is a block diagram illustrating one example of a suitable computing device, according to aspects of the disclosed technology.

Each of client device 151, client device 152, service device 161, service device 162, constrained-environment device 171, and constrained-environment device 172 includes an example of computing device 500 of FIG. 5. Each of the constrained-environment devices is a device that is in a constrained environment. Each of the constrained devices may be, for example, a satellite in Earth's orbit, a device in deep space such as a device on a probe or a spacecraft that is in deep space, a drone, a device on a stationary platform such as a stationary tower or a stationary sensor such as an oil platform, an Internet of Things (IoT) device in a constrained environment, or the like. The constrained-environment devices (e.g., 171 and 172) use sensors onboard the constrained-environment devices to generate and store images.

Service device 161 and service device 162 are each part of a service that is provided on behalf of clients. Each client may communicate with the service via one or more devices, such as client device 151 and client device 152. The service includes aspects that are associated with data collected by constrained-environment devices, including constrained-environment device 171 and constrained-environment device 172. For example, the service may include aspects related to the collection of data from the constrained-environment devices, the analysis of data from the constrained devices, searches in the data from the constrained devices, or the like.

The service that includes service device 161 and service device 162 is arranged to receive information from the constrained-environment devices during scheduled downlinks between the constrained-environment devices and the service. The service stores a large number of images, such as many billions of images, that, over time, were captured by the constrained-environment devices and communicated from the constrained-environment devices to the service over a large number of scheduled downlink sessions. The service may provide services including reverse image searches, and the service may also enable on-cloud models that are stored on the service to be run on images stored by the service.

Examples of these on-cloud models include plane detection models, ship detection models, building detection models, cloud detection models, methane detection models, oil tank detection models, car detection models, fire detection models, or the like. When the service receives a request that is associated with one of the on-cloud models, the service uses a cloud orchestration service to determine which images or portions of images the requested on-cloud model should be run on. After it is determined which images or image tiles the requested on-cloud model should be run-on, the cloud service runs the requested on-cloud model on the determined images or image tiles.

In some examples, the downlink session is a session between one orbiting satellite and a ground station. In other examples, the downlink session involves two or more orbiting satellites, such as via satellite crosslinks, inter-satellite optical laser links, or other suitable forms of satellite communications.

Network 130 may include one or more computer networks, including wired and/or wireless networks, where each network may be, for example, a wireless network, local area network (LAN), a wide-area network (WAN), and/or a global network such as the Internet. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, and/or other communications links known to those skilled in the art. Such satellite links may include, for example, satellite interlink communications and various types of satellite downlinks including satellite downlinks in the X, S, Ka, and Ultra-High Frequency (UHF) bands. Furthermore, remote computers and other related electronic devices could be remotely connected to either LANs or WANs via a modem and temporary telephone link. Network 130 may include various other networks such as one or more networks using local network protocols such as 6LoWPAN, ZigBee, or the like. In essence, network 130 may include any suitable network-based communication method by which information may travel among client device 151, client device 152, service device 161, service device 162, constrained-environment device 171, and constrained-environment device 172. Although each device is shown connected as connected to network 130, that does not necessarily mean that each device communicates with each other device shown. In some examples, some devices shown only communicate with some other devices/services shown via one or more intermediary devices. Also, although network 130 is illustrated as one network, in some examples, network 130 may instead include multiple networks that may or may not be connected with each other, with some of the devices shown communicating with each other through one network of the multiple networks and other of the devices shown instead communicating with each other with a different network of the multiple networks. Further, some of the links, such as satellite links, may be limited or intermittent.

System 100 may include more or less devices than illustrated in FIG. 1, which is shown by way of example only.

Figure 2:
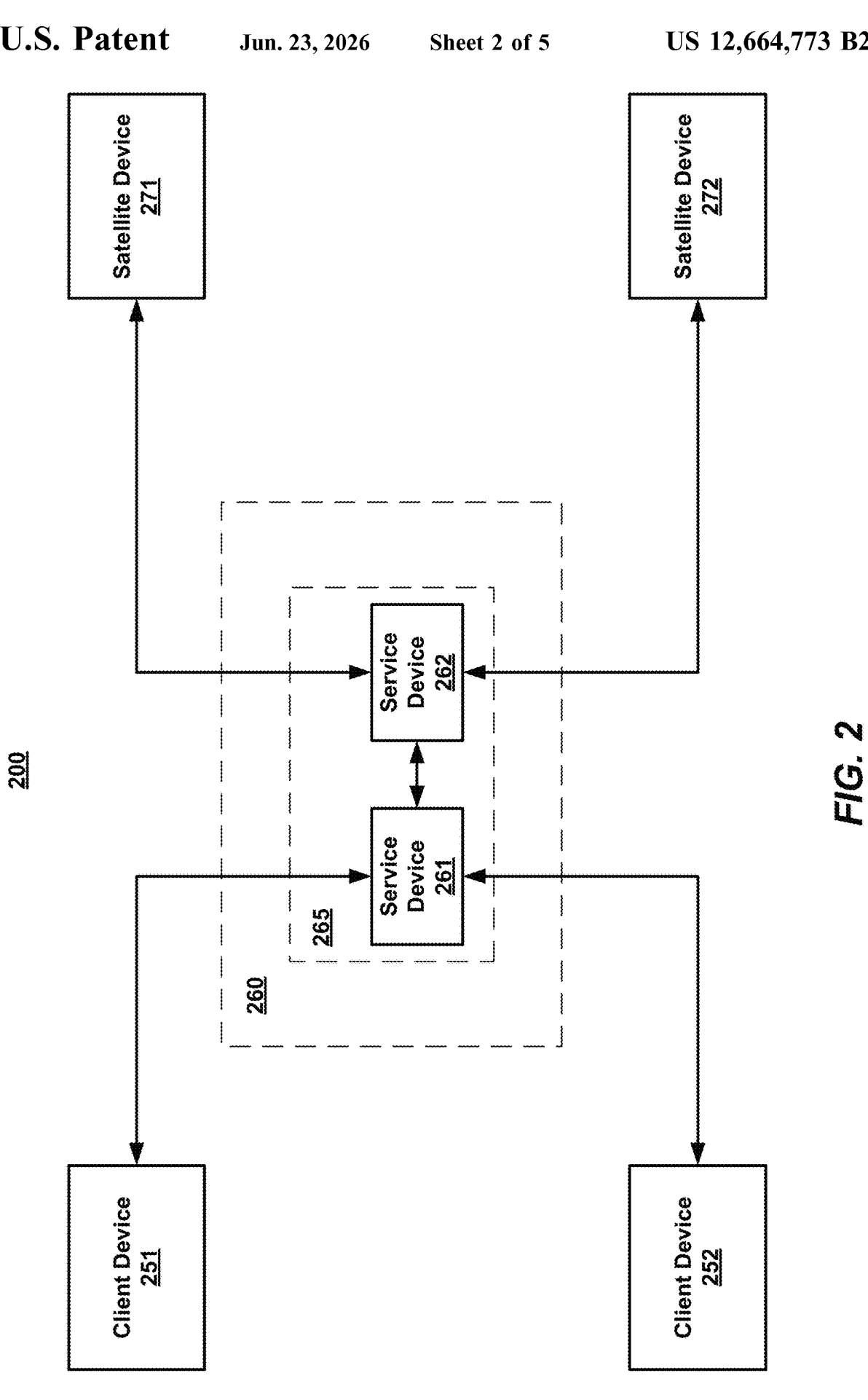
FIG. 2 is a block diagram illustrating an example of a system for cloud model orchestration of spaceborne data.

FIG. 2 is a block diagram illustrating an example of a system (200). System 200 may be an example of system 100 of FIG. 2. System 200 is described as follows in accordance with some examples. System 200 includes client device 251, client device 252, service system 260, satellite device 271, and satellite device 272. Service system 260 includes one or more distributed systems, including distributed system 265. Distributed system 265 includes service device 261 and service device 262. System 200 operates as follows in some examples.

The satellite devices, including satellite devices 271 and 272, are devices onboard satellites that orbit the Earth. The satellite devices store spaceborne data collected by the orbiting satellites. The spaceborne data includes images taken by the satellites. Service system 260 is a cloud service that provides services on behalf of clients, where the services provided on behalf of the clients include at least one service that is associated with spaceborne data collected by the satellite devices. Whereas the satellites are orbiting the Earth, service system 260 is on the Earth. Each client communicates with service system 260 via one or more devices, such as client device 251 and client device 252.

In some examples, some of the satellite devices, such as satellite devices 271 and 272, operate as follows.

The satellite devices include sensors and also include devices that store data. The sensors onboard the orbiting satellites collect data, including raw image data and image metadata, which is all stored onboard the satellite. The raw image data includes raw satellite images. Examples of the image metadata include time, inclination, azimuth angle, altitude, scene center latitude, scene center longitude, viewing angle, incidence angle, sun elevation, sun azimuth, or other suitable metadata. The sensors may include a variety of different sensor types including cameras, synthetic aperture radar, thermal imaging sensors, hyperspectral sensors, video sensors, or other suitable sensor types.

The images provided by the sensors may include two-dimensional images, three-dimensional representations, and may include images such as synthetic aperture radar images or the like. Each of the types of images discussed above is a type of spaceborne data that may be captured by the satellite devices. In some examples, the satellite devices divide each of the stored satellite images into smaller image tiles. For instance, in one example, a full-size image that is 8,192 pixels by 8,192 pixels may be broken down into 256 evenly-sized tiles of 512 pixels by 512 pixels. The smaller tiles are easier to process, analyze, and downlink.

Optionally, in some examples, one or more of the satellite devices (e.g., satellite device 271 or 272) then, onboard the satellite, converts each of the tiles into an embedding, as follows. The tiles are retained and continued to be stored in the satellite devices, and the embeddings are also stored in the satellite devices. The embeddings are feature vectors of floating-point numbers that are ordered list of numerical vectors such that, for two similar images, the corresponding feature vectors are close to each other in the vector space. Similarly, for two dissimilar images, the feature vectors are not close to each other in the vector space. Embeddings are also sometimes referred to as "representations."

For instance, in some examples, an unsupervised machine-learning embedding-generation model is used to convert each of the tiles into an embedding. In one example, a simple Siamese (SimSiam) model, trained on a large number of images such as over 100,000 different image tiles, is used to convert each of the files into a 512-dimensional feature vector. Various suitable numbers of dimensions may be used in various examples, such as at least 256 dimensions in some examples. An unsupervised machine-learning embedding generation model may also be referred to as an unsupervised representation learning model.

Other suitable methods are used to generate the embeddings in other examples. For instance, in some examples, a self-supervised representation learning technique or supervised representation learning technique is used to generate the embeddings. An embedding of a tile may be significantly smaller than the corresponding tile, such as $\frac{1}{12}$ the size of the corresponding tile in one example. As soon as an image is captured by the satellite, the image is divided into tiles and the tiles are converted to embeddings.

In some examples, the satellite has dozens or hundreds of different models onboard which may be used to run against any of the image tiles. The models may include, for example, artificial intelligence (AI) models that are plane detector models, ship detector models, building detector models, cloud detector models, methane detector models, fire detector models, car detector models, or the like. The models may include, for example, classification models, object detection models, and segmentation models. However, the satellite does not have enough power and resources to run all of the models against all of the image tiles. For instance, in some examples, the satellite may only have one graphics processing unit (GPU) on which to run models. Accordingly, optionally, in some examples, onboard model orchestration is performed in the satellite. In examples that perform the optional onboard model orchestration, one or more of the satellite devices (e.g., satellite device 271 or 272) uses the embeddings to determine which of the models should be run on which of the tiles.

It may be desirable to run particular models for various reasons. For instance, it may be desirable to use a cloud detection model to de-prioritize or exclude tiles that contain no useful information due to cloud cover present in the tile. It may be useful to run models that detect particular objects or phenomenon for reasons of prioritization or for identifying data that may require immediate attention. For example, if an image tile includes a potentially dangerous hazard, such as a forest fire, it may be desirable to downlink the image tile as soon as possible rather than waiting for the next scheduled downlink. As another example, it might be determined that a ship detector model should not be run on tiles on which the image is taken over by land or is obstructed by cloud, fog, or smoke, thereby preserving sources for other jobs onboard the satellite. However, the satellite does not have enough power and resources to run all of the models against all of the image tiles. Accordingly, optionally, in some examples, onboard model orchestration is performed in the satellite. In these examples, one or more of the satellite devices (e.g., satellite device 271 or 272) uses the embeddings to determine which of the models should be run on which of the tiles. In examples in which onboard model orchestration is performed, the onboard model orchestration is performed on the image tiles from each of the images captured by the satellite since the last downlink.

After it is determined which models should be run on which tiles, satellite devices (e.g., satellite devices 271 and 272) run the determined models on the tiles. The satellite devices then take appropriate actions based on the results of the models being run on the tiles. For instance, if the model indicates that the image tile may indicate the presence of a significant hazard, in some examples, the satellite device causes the image tile to be downlinked as soon as possible, rather than waiting until the next scheduled downlink. Instead of immediately downloading the image tile, in some examples, a short message or other type of alert is downlinked as soon as possible, because a short message can be downlinked more easily than an image. The model orchestration onboard the satellite enables more efficient use of resources on the satellite and enables more models to be run with the same resources.

Optionally, in some examples, the satellite devices (e.g., satellite devices 271 and 272) use the embeddings to perform downlink prioritization onboard the satellite. In examples in which downlink prioritization and model orchestration are both performed onboard the satellite, the downlink prioritization occurs after the model orchestration is performed onboard the satellite. The downlink prioritization performed onboard the satellite makes use of a set of target embeddings. The set of target embeddings for use in the downlink prioritization is generated by service system 260.

The embeddings included in the set of target embeddings are determined based on the priorities of the client. The set of target embeddings are uploaded from service system 260 to the satellite devices and stored on the satellite devices. The satellite devices automatically triage which tiles should be transmitted by comparing the embeddings to the set of target embeddings. The comparison of the embeddings to the set of target embeddings includes determining which of the embeddings are close, in the vector space, to embeddings in the set of embeddings.

As discussed above, the embeddings included in the set of embeddings are determined based on the priorities of the client. For example, if a client wants to prioritize the downlink of cloud-free imagery, the downlink prioritization may be used to infer which of the image tiles appear to be most cloud-free. The determination for both the onboard downlink prioritization and the onboard model orchestration is made on a tile-by-tile basis based on each of the embeddings, where each of the embeddings was generated from a corresponding tile. The downlink prioritization performed onboard the satellite saves time and bandwidth, ensures access to pertinent assets, and prioritizes decision-making.

In some examples, some information from other tiles in the image, such as mean pixel values, is also used in the determination that is made for each of the tiles. In some examples, the onboard downlink prioritization uses a rule-based decision tree to perform downlink prioritization. In some examples, the decision tree uses both the embeddings and image information to perform the onboard downlink prioritization. The image information that is used during the downlink prioritization includes image metadata in some examples. In some examples, the rules are defined manually by a client. In some examples, the rules are defined based on an analysis of historical usage patterns. In some examples, the historical usage patterns include various suitable information such as existing client requests, existing client searches, historical accesses by clients, sales patterns with clients, or other suitable information. In some examples, the image data used includes geographical information. For instance, some clients may have particular geographical areas of interest, and the prioritization may be based, in part, on whether the tile is in a geographical area of interest to the client.

Each of the satellites performs a downlink at periodic time intervals, in which the satellite communicates with service system 260. As discussed above, service system 260 provides cloud services on behalf of clients, where the cloud services include at least one cloud service associated with spaceborne data collected by the satellite devices (e.g., satellite devices 271 and 272). For example, the cloud services may include storing spaceborne data downlinked from the satellite device, the analysis of the spaceborne data from the constrained devices, searches in the spaceborne data, or the like. Each of the satellite devices communicates information to service system 260 during a separate downlink session that occurs between the satellite device and service system 260. During the downlink session, some of the image tiles onboard the satellite device are downlinked to service system 260. In examples that use onboard downlink prioritization, the downlink of the image tiles is triaged based, at least in part, on the onboard downlink prioritization discussed above.

In some examples, service system 260 stores an embeddings database that operates as follows. The embeddings database is a database that stores a relatively large number of reference embeddings that may be used to assist in determining which image tiles are of the highest value. The value of the image tiles is based at least in part on the priorities of the clients. When a downlink session occurs between a satellite and service system 260, embeddings are sent from satellite devices (e.g., satellite devices 271 and 272) on the satellite to service system 260. For instance, in some examples, the satellite devices send the embeddings for each of the images that has been taken by the satellite since the last downlink. In other examples, some of the embeddings are excluded based on the downlink prioritization performed onboard the satellite. In either case, service system 260 then compares the received embeddings to the reference embeddings in the embeddings database. The comparison determines which of the received embeddings are closest, in the vector space, to a reference embedding.

Service system 260 then analyzes the received embeddings that are determined to be closest to the reference embeddings in order to determine which of these embeddings correspond to high-value image tiles. As discussed above, the value of the image tiles is based at least in part on the priorities of the clients. The determination as to which of the image tiles are of the highest value may be made based on the determined similarities of the embeddings with the reference embeddings, combined with various suitable information such as existing client requests, existing client searches, historical accesses by clients, sales patterns with clients, or other suitable information. After the highest value image tiles are identified, service system 260 communicates to the satellite device the highest value tiles to be downlinked.

Next, the satellite devices downlink the indicated high-value tiles. Service system 260 then receives the downlinked tiles and then stores the received tiles. In some examples, the determination and downlinking of the high-value image tiles occurs in a matter of seconds during a single downlink session and occurs during each of the scheduled downlink sessions. In some examples, the entire downlink session is about ten minutes as the satellite passes over the ground station. The determination of high-value image tiles that occurs during the downlink session between the satellite and service system 260 on the ground allows for a relatively seamless communication between the satellite and service system 260, increases the speed of decision-making, and ensures the capture of high-value data. After the high-value tiles are downlinked, service system 260 receives the downlinked tiles and then stores the received tiles.

As discussed above, in some examples, the downlink session is a session between one orbiting satellite and service system 260. In other examples, the downlink session involves two or more orbiting satellites, such as via satellite crosslinks, inter-satellite optical laser links, or other suitable forms of satellite communications.

In some examples, onboard downlink prioritization is not performed and edge-cloud image orchestration is performed, or vice versa. In some examples, both onboard downlink prioritization and edge-cloud image orchestration are performed. In examples in which both onboard downlink prioritization and edge-cloud image orchestration are performed, the particular image files that are downlinked during the downlink session is based upon both the onboard downlink prioritization and the edge-cloud image orchestration.

In some examples, service system 260 also operates as follows. The images collected over time from the various downlink sessions from one or more satellites are stored in service system 260 and have associated metadata according to the SpatioTemporal Asset Catalog (STAC) specification. The associated metadata is also stored in service system 260, but in separate storage than the database that stores the images. The images are divided into image tiles as discussed above. Based on all of the images collected from one or more satellites over time, service system 260 stores a large number of image tiles, such as, for example, more than a hundred million image tiles or well over one billion image tiles. Service system 260 also stores an image embedding for each of the image tiles. Image embeddings are generated from an embedding-generation model as discussed above. The generation of the image embeddings is performed by service system 260 itself in some embodiments, and in other embodiments the generation of the image embeddings is performed externally with the image embeddings received by service system 260.

Service system 260 enables reverse image searches to be performed by clients based on the embeddings of the images. In some examples, the reverse image search includes querying the metadata database of STAC items via an Application Programming Interface (API) or user interface. In this way, a user can perform a visual search against existing images in a database to find similar images of interest. In some examples, the image embeddings and the STAC metadata items for the image tiles reside in separate databases.

The embeddings are also used to recommend similar images to users. For example, if a client is an analyst that is interested in mapping the location of small solar installations within the United States, service system 260 may recommend additional images where solar installations are likely to be visible.

In some examples, embeddings for each of the image tiles are generated by an embedding-generation model onboard the satellite, as discussed above. In some examples, embeddings are not generated onboard the satellite and reference embeddings are not stored onboard the satellite. Instead, in these examples, embeddings are generated by service system 260 for use in reverse image searching, cloud model orchestration, or other suitable service performed by service system 260, but are not generated, stored, or used onboard the satellites.

Service system 260 enables clients to run models against any of the satellite images stored in service system 260. Some examples of service system 260 store a large number of on-cloud models, such as hundreds of models, that may be run against images. The on-cloud models may include, for example, artificial intelligence (AI) models that are plane detection models, ship detection models, building detection models, cloud detection models, methane detection models, oil tank detection models, car detection models, fire detection models, or the like. However, running every model against all of the images would be relatively inefficient.

Accordingly, on-cloud model orchestration may be used to determine which models to run on which images. The on-cloud model orchestration may be done according to various use cases in various examples. A first use case for on-cloud model orchestration is performed as follows.

Even though service system 260 has access to significantly more resources, GPUs, and the like than onboard an orbiting satellite, it may still be relatively expensive to run a model on a large number of images. For example, in one use case, a client may wish to detect poultry barns on all high-resolution images covering the continental United States, which may be many millions of images. Accordingly, when a client request associated with one or more on-cloud models is received by service system 260, cloud model orchestration is performed by service system 260. One example of the cloud model orchestration is performed by service system 260 as follows.

The model orchestration uses the embeddings of images taken from the satellite to determine which of the models should be run on which of the images. For example, a model trained to find airplanes on a tarmac may work one day but fail the next if it snows at the given airport of interest. The cloud model orchestration performed in service system 260 alerts the client to this type of change and prevents the model from giving the user erroneous results.

Using the embeddings, a determination is made for each model and for each image as to whether that model should be run on that image. As another example, a model that detects poultry barns might be run only on tiles that correspond to rural or semi-rural locations, that are not water, and that have a structure on them. In another example, the model that detects poultry barns is only run on tiles in which the embeddings of the tile are close, in the vector space, to embeddings of images in which a poultry barn was previously detected. In this way, the model that detects poultry barns can avoid running on tiles on which it is unnecessary to run that model. The cloud model orchestration performed in service system 260 enables the ability to make more efficient use of the resources of service system 260.

For each on-cloud model that can be run against an image tile, service system 260 stores a set of reference embeddings for that model. When a client request that is associated with one or more of the on-cloud models is received, service system 260 performs cloud model orchestration. During the cloud model orchestration performed by service system 260, each image tile is separately compared, in the vector space, to the set of reference embeddings for each of the on-cloud models associated with the client request that can be run against that image tile. For each of these comparisons, if the embedding is determined to be close, in the vector space, to one of the reference embeddings in the set of reference embeddings for an on-cloud model associated with the request, then it is determined that that on-cloud model should be run on that image tile.

The set of reference embeddings for each model may be determined in different suitable ways in different examples.

For instance, in some examples, the reference embeddings may be determined based on a "validation mode." In these examples, a model's reference embeddings are a sample of image embeddings that represent the full extent of imagery that the model was trained on. Using such reference embeddings prevents the model from being run on imagery that the model has not been trained to process.

For instance, in one example, an airplane detection model is trained over airports in Florida, and the set of reference embeddings is determined based on the training of the airplane detection model. In this example, the model orchestration step would determine that the model should not be run on an image tile taken over a snowy airport in Alaska, because it is unlikely that the model would perform well. However, in this example, the model orchestration would determine that the model should be run over airports in Thailand because the surrounding environments in Florida and Thailand are similar.

In some examples, the reference embeddings may be determined based on a "select mode." In these examples, a model's reference embeddings are a sample of image embeddings for images in which the model previously identified objects of interest. For instance, in one example, for a plane detector model, the reference embeddings are the image embeddings for images in which a plane has previously been found by the model in that image.

In the first use case of on-cloud model orchestration discussed above, there is a client request that is associated with an on-cloud model, and a determination is made as to which image tiles that on-cloud model should be executed on.

In a second use case of on-cloud model orchestration, for one or more image tiles, a determination is made as to which on-cloud models should be run on that image tile. For instance, a client may have obtained rights to one or more image tiles, and the client may wish to know which models may be run on those image tiles. In some examples, on-cloud model orchestration may be used to determine, for each image tile stored in service system 260, which models may be run on that image tile, with the information on which models may be run on which image tiles made available to clients or potential clients. In this way, a client can select an image of interest and automatically know the best candidate models to run against that image.

For the second use case of on-cloud model orchestration discussed above, for each of one or more image tiles, the embedding corresponding to that image tile is compared, in the vector space, with each reference embedding in the set of reference embeddings corresponding to one of the on-cloud models. If and only if the embedding that corresponds to that image tile is close, in the vector space, to one of the reference embeddings in the set of reference embeddings, it is determined that that model should be run on that image tile. This process is then repeated for each of the other on-cloud models. In this way, the on-cloud model orchestration determines, for each of the image tiles, which on-cloud models should be run on that image tile.

Examples of system 200 may be useful for a variety of different example use cases for a variety of different example clients.

For instance, one example of a client is an oil and gas company that makes use of an example of system 200 to decrease the amount of time it takes for the client to detect and address large methane leaks across their oil wells, pipelines, and refineries spread out over an oil field covering hundreds of square miles. Quick detection of methane leaks may significantly reduce compliance, regulatory, and enforcement risks for the client. In this example, a methane detection model is employed onboard a constellation of satellites in order to enable rapid alerting of methane leaks. Every time a satellite within the constellation passes over the oil field of interest, this model is "turned on" within the satellite to look for methane leaks. This is accomplished onboard the satellite as follows in this example.

Of all of the images taken over an oil field by the satellites, about 99% of the images or image tiles will be cloudy or will not contain a methane leak. As part of the model orchestration onboard the satellites, the satellite devices use the embeddings of the image tiles to perform an initial analysis and identify the approximately 1% of image tiles that could contain a methane leak. An onboard methane detection model is then run onboard the satellite on only those image tiles that could contain a methane leak. This initial analysis is based on the embeddings of the image tiles being close, in the vector space, to the embeddings of image tiles in which methane leaks were previously detected by the methane detection model. The methane detection model calculates the approximate location, size, and probability of a methane leak. The location and size for high-probability leaks are then quickly downlinked to service system 260 and then shared with the oil and gas company via client device 271, allowing the company to more rapidly deploy a crew to investigate and fix the leak.

Typically, oil and gas companies that want to detect methane plumes in satellite imagery need to order and downlink entire satellite images before they can determine if the imagery ordered by the company contains a methane plume at all. Ordering such imagery is typically incredibly costly and typically takes from hours to weeks before the imagery is delivered to the oil and gas company for analysis. However, in this example, system 200 enables a methane detection model to be run persistently onboard a spacecraft alongside other models from other clients, enabling real-time monitoring for the oil and gas company while limiting resource and downlink costs for the satellite operator.

Another example of a client is an energy trading hedge fund that is tasked with updating the fund's dataset of oil storage tanks globally, which the client uses to inform trading decisions. The example analyst client doesn't have the funds, time, or resources to run an oil tank detection model over all available high-resolution imagery globally. Instead, the example client uses an example of system 200 to identify a subset of existing images that likely contain oil tanks to then pass through an oil tank detection model. This dramatically reduces the time, cost, and complexity required to update the associated dataset. This is accomplished by the example client using an example of system 200 as follows.

The client provides a few reference images of oil tanks, and service system 260 obtains embeddings for those reference images. The client can then initiate a catalog search of existing high-resolution imagery to identify the approximately 0.05% of images/tiles that have very similar embeddings that are indicative of a possible oil tank within the image. The identified images are then passed through an oil tank detection model by service system 260 to calculate the location and size of any oil tanks within the image. The results of the detection model are then provided to the client.

Typically, if an analyst wanted to inventory all oil storage tanks globally, the analyst would either 1) need to run their oil tank detection model over a complete global archive of satellite imagery which is incredibly costly to obtain and resource/time intensive to run or 2) rely on an external source of information to narrow their search. However, these external data sources typically are incomplete and would result in a significant number of oil tanks being missed. Instead, system 200 allows the analyst to efficiently build a global dataset of oil tanks using a fraction of the time and resources it would otherwise take to run an oil tank detection model across all images/tiles.

Another example of a client is the Coast Guard looking for ships engaged in illicit activities (e.g., drug running, oil embargo violations, or the like). Quick detection of such activities would increase the odds of arrest and prosecution. An example of system 200 may be used with the Coast Guard as a client as follows.

A ship detection model is employed onboard a constellation of satellites in order to provide interdiction teams of the Coast Guard with real-time insights. Only approximately 0.1% of images/tiles taken by a satellite will be of a manmade object in the ocean. The model orchestration performed onboard the satellite will allow the approximately 0.1% of images/tiles that contain a manmade object in the ocean to be identified. The satellite device onboard the satellite then performs an object detection model on these identified tiles in order to predict the class of the object (e.g., oil platform, ship, wind turbine, etc.) present on the tiles.

For each tile on which the object detection model determines that a ship is present on the tile, the tile is flagged for further analysis. The embeddings for these tiles along with the location of the tile is then rapidly downlinked from the satellite to service system 260 for further analysis. Downlinking the embeddings and metadata is much faster and much more efficient than downlinking an entire image. Service system 260 then compares the downlinked embeddings to prior images and external data. The downlinked embeddings are rapidly compared to embeddings generated for all prior images to predict the type of ship in the image (e.g., cargo ship, tanker, cruise ship, trawler, etc.).

The detected locations are also compared to external data sources (e.g., ship Automatic Identification System (AIS) transponder data). If these two sources don't align, for example: 1) service system 260 appears to have identified a ship in an image, but there is no AIS transponder record for that ship or 2) an embedding for a tile is similar to prior embeddings of oil tankers, but the AIS transponder data for that ship reports it is a trawler. Discrepancies such as these are indicative of possible nefarious behavior that may require additional investigation by the Coast Guard.

FIG. 2 illustrates a small number of systems and devices for illustrative purposes. Various examples of system 200 may include many more devices and systems than shown in FIG. 2, which is illustrated by way of example only. In addition, many examples of system 200 may be different than the literal examples of system 200 discussed above. For example, while the discussion of system 200 includes satellites, in various examples, in addition to or instead of satellites, system 200 may include restrained environment devices other than satellites, such as spacecraft in deep space, drones, stationary sensors such as oil platforms, IoT devices in constrained environments, or other suitable constrained-environment devices.

Illustrative Processes

Figure 3:
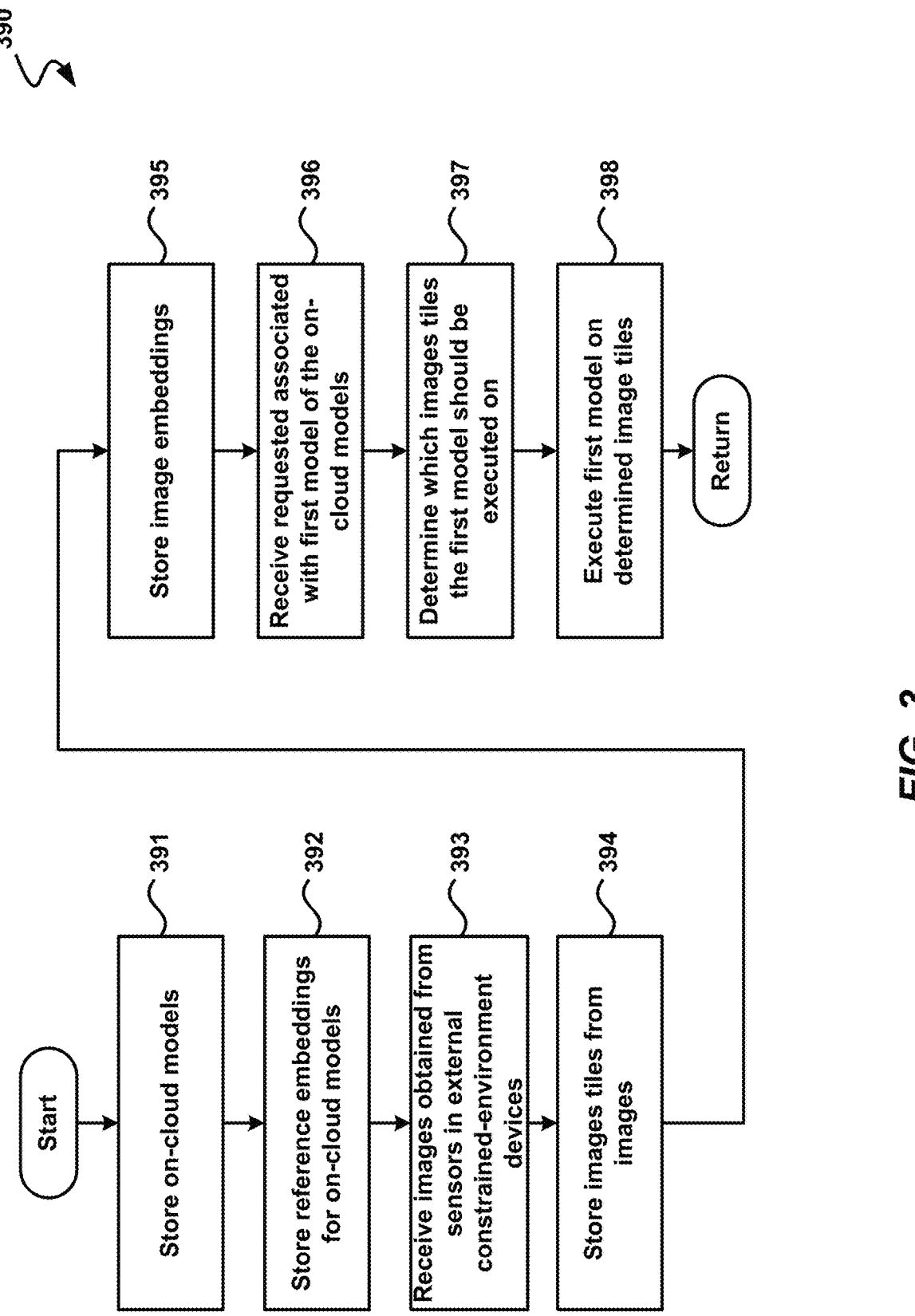
FIG. 3 is a flow diagram illustrating an example process for cloud model orchestration of constrained-environment-device data.

FIG. 3 is a diagram illustrating an example dataflow. In some examples, process 390 proceeds as follows. The steps of process 390 are performed on a cloud service, such as service system 260 of FIG. 2.

Step 391 occurs first. At step 391, a plurality of on-cloud models is stored. As shown, step 392 occurs next. At step 392, for each on-cloud model of the plurality of on-cloud models, a corresponding set of reference embeddings is stored. At step 393, a plurality of images obtained from sensors onboard at least one constrained-environment device that is external to the first distributed system is received. As shown, step 394 occurs next. At step 394, a plurality of image tiles is stored such that the plurality of image tiles includes, for each image of the plurality of images, evenly-spaced portions of the image. As shown, step 395 occurs next. At step 395, a plurality of image embeddings generated via an embedding-generation model from the plurality of image tiles is stored.

As shown, step 396 occurs next. At step 396, a request that is associated with a first model of the plurality of on-cloud models is received. As shown, step 397 occurs next. At step 397, using the set of reference embeddings for the first model and the plurality of image embeddings, for each image tile in the plurality of image tiles, whether the first model should be executed on the image tile is determined. As shown, step 398 occurs next. At step 398, for each image tile for which a determination is made that the first model should be executed on that image tile, the first model is executed on that image tile. The process then advances to a return block, where other processing is resumed.

Illustrative Devices/Operating Environments

Figure 4:
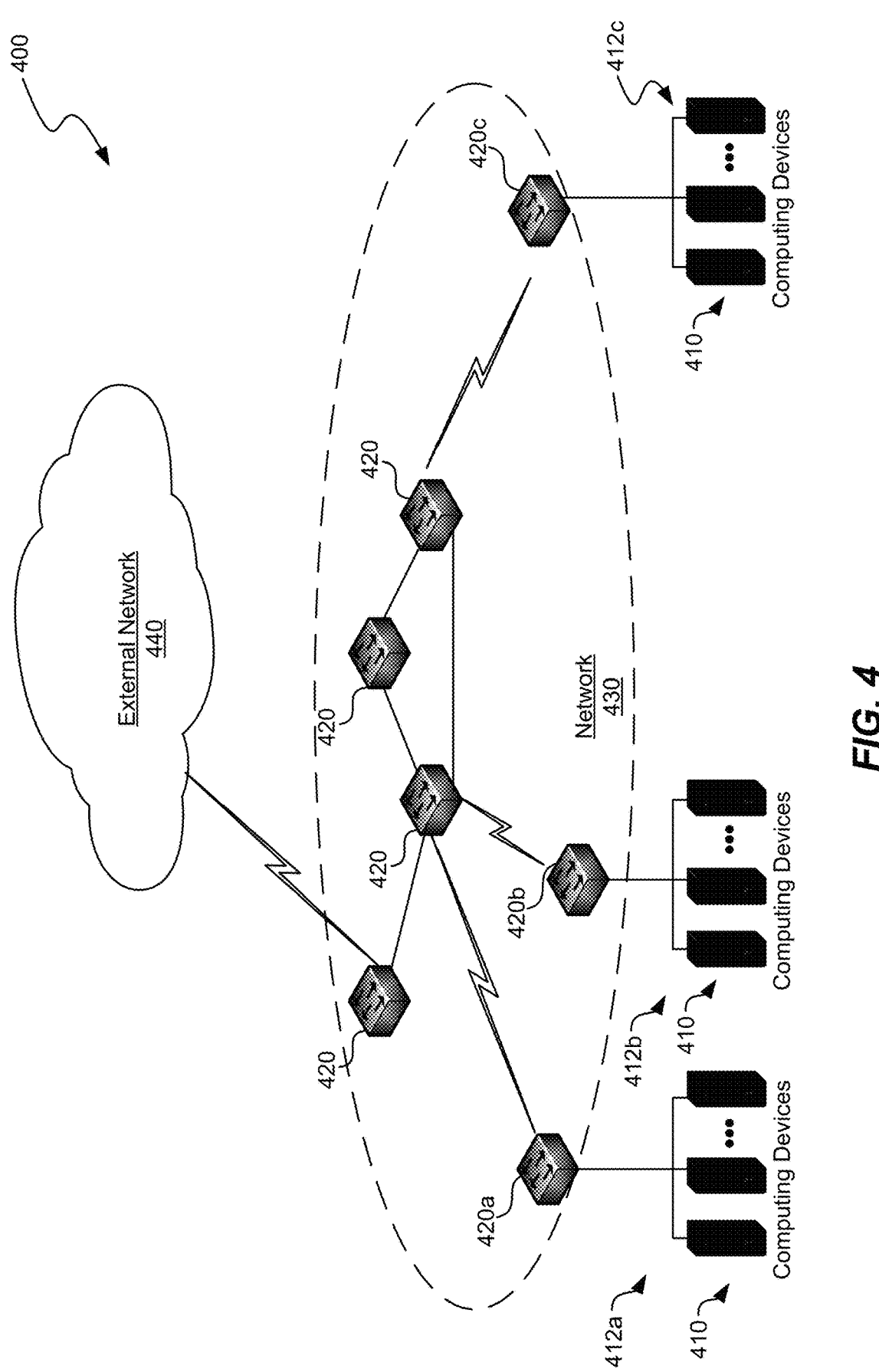
FIG. 4 is a block diagram illustrating one example of a suitable environment in which aspects of the technology may be employed.

FIG. 4 is a diagram of environment 400 in which aspects of the technology may be practiced. As shown, environment 400 includes computing devices 410, as well as network nodes 420, connected via network 430. Even though particular components of environment 400 are shown in FIG. 4, in other examples, environment 400 can also include additional and/or different components. For example, in certain examples, the environment 400 can also include network storage devices, maintenance managers, and/or other suitable components (not shown). Computing devices 410 shown in FIG. 4 may be in various locations, including a local computer, on premise, in the cloud, or the like. For example, computer devices 410 may be on the client side, on the server side, or the like.

As shown in FIG. 4, network 430 can include one or more network nodes 420 that interconnect multiple computing devices 410, and connect computing devices 410 to external network 440, e.g., the Internet or an intranet. For example, network nodes 420 may include switches, routers, hubs, network controllers, or other network elements. In certain examples, computing devices 410 can be organized into racks, action zones, groups, sets, or other suitable divisions. For example, in the illustrated example, computing devices 410 are grouped into three host sets identified individually as first, second, and third host sets 412a-112c. In the illustrated example, each of host sets 412a-112c is operatively coupled to a corresponding network node 420a-120c, respectively, which are commonly referred to as "top-of-rack" or "TOR" network nodes. TOR network nodes 420a-120c can then be operatively coupled to additional network nodes 420 to form a computer network in a hierarchical, flat, mesh, or other suitable types of topology that allows communications between computing devices 410 and external network 440. In other examples, multiple host sets 412a-112c may share a single network node 420. Computing devices 410 may be virtually any type of general or specific-purpose computing device. For example, these computing devices may be user devices such as desktop computers, laptop computers, tablet computers, display devices, cameras, printers, or smartphones. However, in a data center environment, these computing devices may be server devices such as application server computers, virtual computing host computers, or file server computers. Moreover, computing devices 410 may be individually configured to provide computing, storage, and/or other suitable computing services.

In some examples, one or more of the computing devices 410 is a device that is configured to be at least part of a system for spaceborne-sensor-related prioritization.

Illustrative Computing Device

FIG. 5 is a diagram illustrating one example of computing device 500 in which aspects of the technology may be practiced. Computing device 500 may be virtually any type of general- or specific-purpose computing device. For example, computing device 500 may be a user device such as a desktop computer, a laptop computer, a tablet computer, a display device, a camera, a printer, or a smartphone. Likewise, computing device 500 may also be a server device such as an application server computer, a virtual computing host computer, or a file server computer, e.g., computing device 500 may be an example of computing device 410 or network node 420 of FIG. 4. Likewise, computer device 500 may be an example any of the devices, a device within any of the distributed systems, illustrated in or referred to in any of the above figures, as discussed in greater detail above and below. As illustrated in FIG. 5, computing device 500 may include processing circuit 510, operating memory 520, memory controller 530, bus 540, data storage memory 550, input interface 560, output interface 570, and network adapter 580. Each of these afore-listed components of computing device 500 includes at least one hardware element.

Computing device 500 includes at least one processing circuit 510 configured to execute instructions, such as instructions for implementing the herein-described workloads, processes, and/or technology. Processing circuit 510 may include a microprocessor, a microcontroller, a graphics processor, a coprocessor, a field-programmable gate array, a programmable logic device, a signal processor, and/or any other circuit suitable for processing data. The aforementioned instructions, along with other data (e.g., datasets, metadata, operating system instructions, etc.), may be stored in operating memory 520 during run-time of computing device 500. Operating memory 520 may also include any of a variety of data storage devices/components, such as volatile memories, semi-volatile memories, random access memories, static memories, caches, buffers, and/or other media used to store run-time information. In one example, operating memory 520 does not retain information when computing device 500 is powered off. Rather, computing device 500 may be configured to transfer instructions from a non-volatile data storage component (e.g., data storage component 550) to operating memory 520 as part of a booting or other loading process. In some examples, other forms of execution may be employed, such as execution directly from data storage component 550, e.g., execute In Place (XIP).

Operating memory 520 may include $4^{th}$ generation double data rate (DDR4) memory, $3^{rd}$ generation double data rate (DDR3) memory, other dynamic random access memory (DRAM), High Bandwidth Memory (HBM), Hybrid Memory Cube memory, 3D-stacked memory, static random access memory (SRAM), magnetoresistive random access memory (MRAM), pseudorandom random access memory (PSRAM), and/or other memory, and such memory may comprise one or more memory circuits integrated onto a DIMM, SIMM, SODIMM, Known Good Die (KGD), or other packaging. Such operating memory modules or devices may be organized according to channels, ranks, and banks. For example, operating memory devices may be coupled to processing circuit 510 via memory controller 530 in channels. One example of computing device 500 may include one or two DIMMs per channel, with one or two ranks per channel. Operating memory within a rank may operate with a shared clock, and shared address and command bus. Also, an operating memory device may be organized into several banks where a bank can be thought of as an array addressed by row and column. Based on such an organization of operating memory, physical addresses within the operating memory may be referred to by a tuple of channel, rank, bank, row, and column.

Despite the above-discussion, operating memory 520 specifically does not include or encompass communications media, any communications medium, or any signals per se.

Memory controller 530 is configured to interface processing circuit 510 to operating memory 520. For example, memory controller 530 may be configured to interface commands, addresses, and data between operating memory 520 and processing circuit 510. Memory controller 530 may also be configured to abstract or otherwise manage certain aspects of memory management from or for processing circuit 510. Although memory controller 530 is illustrated as single memory controller separate from processing circuit 510, in other examples, multiple memory controllers may be employed, memory controller(s) may be integrated with operating memory 520, and/or the like. Further, memory controller(s) may be integrated into processing circuit 510. These and other variations are possible.

In computing device 500, data storage memory 550, input interface 560, output interface 570, and network adapter 580 are interfaced to processing circuit 510 by bus 540. Although FIG. 5 illustrates bus 540 as a single passive bus, other configurations, such as a collection of buses, a collection of point-to-point links, an input/output controller, a bridge, other interface circuitry, and/or any collection thereof may also be suitably employed for interfacing data storage memory 550, input interface 560, output interface 570, and/or network adapter 580 to processing circuit 510.

In computing device 500, data storage memory 550 is employed for long-term non-volatile data storage. Data storage memory 550 may include any of a variety of non-volatile data storage devices/components, such as non-volatile memories, disks, disk drives, hard drives, solid-state drives, and/or any other media that can be used for the non-volatile storage of information. However, data storage memory 550 specifically does not include or encompass communications media, any communications medium, or any signals per se. In contrast to operating memory 520, data storage memory 550 is employed by computing device 500 for non-volatile long-term data storage, instead of for run-time data storage.

Also, computing device 500 may include or be coupled to any type of processor-readable media such as processor-readable storage media (e.g., operating memory 520 and data storage memory 550) and communication media (e.g., communication signals and radio waves). While the term processor-readable storage media includes operating memory 520 and data storage memory 550, the term "processor-readable storage media," throughout the specification and the claims, whether used in the singular or the plural, is defined herein so that the term "processor-readable storage media" specifically excludes and does not encompass communications media, any communications medium, or any signals per se. However, the term "processor-readable storage media" does encompass processor cache, Random Access Memory (RAM), register memory, and/or the like.

Computing device 500 also includes input interface 560, which may be configured to enable computing device 500 to receive input from users or from other devices. In addition, computing device 500 includes output interface 570, which may be configured to provide output from computing device 500. In one example, output interface 570 includes a frame buffer, graphics processor, graphics processor or accelerator, and is configured to render displays for presentation on a separate visual display device (such as a monitor, projector, virtual computing client computer, etc.). In another example, output interface 570 includes a visual display device and is configured to render and present displays for viewing. In yet another example, input interface 560 and/or output interface 570 may include a universal asynchronous receiver/transmitter (UART), a Serial Peripheral Interface (SPI), Inter-Integrated Circuit (I2C), a General-purpose input/output (GPIO), and/or the like. Moreover, input interface 560 and/or output interface 570 may include or be interfaced to any number or type of peripherals.

In the illustrated example, computing device 500 is configured to communicate with other computing devices or entities via network adapter 580. Network adapter 580 may include a wired network adapter, e.g., an Ethernet adapter, a Token Ring adapter, or a Digital Subscriber Line (DSL) adapter. Network adapter 580 may also include a wireless network adapter, for example, a Wi-Fi adapter, a Bluetooth adapter, a ZigBee adapter, a Long-Term Evolution (LTE) adapter, SigFox, LoRa, Powerline, or a 5G adapter.

Although computing device 500 is illustrated with certain components configured in a particular arrangement, these components and arrangements are merely one example of a computing device in which the technology may be employed. In other examples, data storage memory 550, input interface 560, output interface 570, or network adapter 580 may be directly coupled to processing circuit 510 or be coupled to processing circuit 510 via an input/output controller, a bridge, or other interface circuitry. Other variations of the technology are possible.

Some examples of computing device 500 include at least one memory (e.g., operating memory 520) having processor-executable code stored therein, and at least one processor (e.g., processing unit 510) that is adapted to execute the processor-executable code, wherein the processor-executable code includes processor-executable instructions that, in response to execution, enables computing device 500 to perform actions, where the actions may include, in some examples, actions for one or more processes described herein, such as the process shown in FIG. 3, as discussed in greater detail above.

The above description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of examples of the technology. It is intended that the terminology used in this disclosure be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Throughout the specification and claims, the following terms take at least the meanings explicitly associated herein, unless the context dictates otherwise. The meanings identified below do not necessarily limit the terms, but merely provide illustrative examples for the terms. For example, each of the terms "based on" and "based upon" is not exclusive, and is equivalent to the term "based, at least in part, on," and includes the option of being based on additional factors, some of which may not be described herein. As another example, the term "via" is not exclusive, and is equivalent to the term "via, at least in part," and includes the option of being via additional factors, some of which may not be described herein. The meaning of "in" includes "in" and "on." The phrase "in one embodiment," or "in one example," as used herein does not necessarily refer to the same embodiment or example, although it may. Use of particular textual numeric designators does not imply the existence of lesser-valued numerical designators. For example, reciting "a widget selected from the group consisting of a third foo and a fourth bar" would not itself imply that there are at least three foo, nor that there are at least four bar, elements. References in the singular are made merely for clarity of reading and include plural references unless plural references are specifically excluded. The term "or" is an inclusive "or" operator unless specifically indicated otherwise. For example, the phrases "A or B" means "A, B, or A and B." As used herein, the terms "component" and "system" are intended to encompass hardware, software, or various combinations of hardware and software. Thus, for example, a system or component may be a process, a process executing on a computing device, the computing device, or a portion thereof. The term "cloud" or "cloud computing" refers to shared pools of configurable computer system resources and higher-level services over a wide-area network, typically the Internet. "Edge" devices refer to devices that are not themselves part of the cloud but are devices that serve as an entry point into enterprise or service provider core networks.

CONCLUSION

While the above Detailed Description describes certain examples of the technology, and describes the best mode contemplated, no matter how detailed the above appears in text, the technology can be practiced in many ways. Details may vary in implementation, while still being encompassed by the technology described herein. As noted above, particular terminology used when describing certain features or aspects of the technology should not be taken to imply that the terminology is being redefined herein to be restricted to any specific characteristics, features, or aspects with which that terminology is associated. In general, the terms used in the following claims should not be construed to limit the technology to the specific examples disclosed herein, unless the Detailed Description explicitly defines such terms. Accordingly, the actual scope of the technology encompasses not only the disclosed examples, but also all equivalent ways of practicing or implementing the technology.

I claim:

1. An apparatus, comprising:
a first distributed system including a first device and a second device that is in networked communication with the first device, wherein the first distributed system is part of a cloud service, and wherein the first distributed system is configured to perform actions, including, on the cloud service:
storing a plurality of on-cloud models;
storing, for each on-cloud model of the plurality of on-cloud models, a corresponding set of reference embeddings;
receiving a plurality of images obtained from sensors onboard at least one constrained-environment device that is external to the first distributed system;
storing a plurality of image tiles such that the plurality of image tiles includes, for at least one image of the plurality of images, evenly-spaced portions of the image;
storing a plurality of image embeddings generated via an embedding-generation model from the plurality of image tiles; and
using the set of reference embeddings for a first model of the plurality of on-cloud models and the plurality of image embeddings, for each image tile in the plurality of image tiles, determining whether the first model should be executed on the image tile.

2. The apparatus of claim 1, wherein the first model includes at least one of a plane detection model, a ship detection model, a building detection model, a cloud detection model, a methane detection model, an oil tank detection model, a car detection model, or a fire detection model.

3. The apparatus of claim 1, wherein the image embeddings of the plurality of image embeddings are feature vectors of floating-point numbers.

4. The apparatus of claim 1, wherein the image embeddings of the plurality of image embeddings are feature vectors each having at least 256 dimensions.

5. The apparatus of claim 1, wherein the plurality of image tiles includes at least one hundred million image tiles.

6. The apparatus of claim 1, wherein the embedding-generation model includes at least one of an unsupervised representation learning model, a self-supervised representation learning technique, or a supervised representation learning technique.

7. The apparatus of claim 1, wherein the sensors onboard the at least one constrained-environment device include at least one of a camera, a synthetic aperture radar, a thermal imaging sensor, a hyperspectral sensor, or a video sensor.

8. The apparatus of claim 1, wherein each of the at least one constrained-environment device is at least one of: an Internet of Things device that is in a constrained environment, an orbiting satellite, a spacecraft, or a stationary platform.

9. The apparatus of claim 1, wherein using the set of reference embeddings for the first model and the plurality of image embeddings, for each image tile in the plurality of image tiles, determining whether the first model should be executed on the image tile includes comparing, in a vector space, the image embedding that corresponds to that image tile with the reference embeddings in the set of reference embeddings for the first model.

10. The apparatus of claim 9, wherein using the set of reference embeddings for the first model and the plurality of image embeddings, for each image tile in the plurality of image tiles, determining whether the first model should be executed on the image tile further includes determining that the first model should be executed on the image tile if and only if the image embedding that corresponds to that image tile is close, in the vector space, to at least one of the reference embeddings in the set of reference embeddings for the first model.

11. The apparatus of claim 1, wherein the at least one constrained-environment device includes an orbiting satellite.

12. The apparatus of claim 11, wherein the plurality of images includes a plurality of satellite images.

13. A method, comprising, on a cloud service:
storing a plurality of on-cloud models;
storing, for each on-cloud model of the plurality of on-cloud models, a corresponding set of reference embeddings;
receiving a plurality of images obtained from sensors onboard at least one constrained-environment device that is external to a first distributed system;
storing a plurality of image tiles such that the plurality of image tiles includes, for each image of the plurality of images, portions of the image, and wherein the plurality of image tiles includes at least one hundred million image tiles;
storing a plurality of image embeddings generated via an embedding-generation model from the plurality of image tiles;
receiving a request that is associated with a first model of the plurality of on-cloud models;
using the set of reference embeddings for the first model and the plurality of image embeddings, for each image tile in the plurality of image tiles, determining whether the first model should be executed on the image tile; and
for each image tile for which a determination is made that the first model should be executed on that image tile, executing the first model on that image tile.

14. The method of claim 13, wherein the first model includes at least one of a plane detection model, a ship detection model, a building detection model, a cloud detection model, a methane detection model, an oil tank detection model, a car detection model, or a fire detection model.

15. The method of claim 13, wherein using the set of reference embeddings for the first model and the plurality of image embeddings, for each image tile in the plurality of image tiles, determining whether the first model should be executed on the image tile includes comparing, in a vector space, the image embedding that corresponds to that image tile with the reference embeddings in the set of reference embeddings for the first model.

16. The method of claim 15, wherein using the set of reference embeddings for the first model and the plurality of image embeddings, for each image tile in the plurality of image tiles, determining whether the first model should be executed on the image tile further includes determining that the first model should be executed on the image tile if and only if the image embedding that corresponds to that image tile is close, in the vector space, to at least one of the reference embeddings in the set of reference embeddings for the first model.

17. A processor-readable storage medium, having stored thereon processor-executable code that, upon execution by at least one processor, enables actions, comprising, on a cloud service:
providing a plurality of on-cloud models;
providing, for each on-cloud model of the plurality of on-cloud models, a corresponding set of reference embeddings;
receiving a plurality of images obtained from sensors onboard at least one orbiting satellite that is external to a first distributed system;
providing a plurality of image tiles such that the plurality of image tiles includes, for at least one image of the plurality of images, portions of the image;
providing a plurality of image embeddings generated via an embedding-generation model from the plurality of image tiles; and
using the set of reference embeddings for a first model of the plurality of on-cloud models and the plurality of image embeddings, for each image tile in the plurality of image tiles, determining whether the first model should be executed on the image tile.

18. The processor-readable storage medium of claim 17, wherein the first model includes at least one of a plane detection model, a ship detection model, a building detection model, a cloud detection model, a methane detection model, an oil tank detection model, a car detection model, or a fire detection model.

19. The processor-readable storage medium of claim 17, wherein using the set of reference embeddings for the first model and the plurality of image embeddings, for each image tile in the plurality of image tiles, determining whether the first model should be executed on the image tile includes comparing, in a vector space, the image embedding that corresponds to that image tile with the reference embeddings in the set of reference embeddings for the first model.

20. The processor-readable storage medium of claim 19, wherein using the set of reference embeddings for the first model and the plurality of image embeddings, for each image tile in the plurality of image tiles, determining whether the first model should be executed on the image tile further includes determining that the first model should be executed on the image tile if and only if the image embedding that corresponds to that image tile is close, in the vector space, to at least one of the reference embeddings in the set of reference embeddings for the first model.

* * * * *